(12) United States Patent
Tsotsis

(10) Patent No.: US 8,607,835 B2
(45) Date of Patent: Dec. 17, 2013

(54) METHOD AND APPARATUS FOR LOW-BULK TOUGHENED FABRICS FOR LOW-PRESSURE MOLDING PROCESSES

(71) Applicant: The Boeing Company, Chicago, IL (US)

(72) Inventor: Thomas Karl Tsotsis, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/646,890

(22) Filed: Oct. 8, 2012

(65) Prior Publication Data

US 2013/0032292 A1 Feb. 7, 2013

Related U.S. Application Data

(60) Division of application No. 12/558,461, filed on Sep. 11, 2009, now Pat. No. 8,372,231, which is a continuation-in-part of application No. 11/937,010, filed on Nov. 8, 2007, now Pat. No. 8,361,262.

(51) Int. Cl.
*B29C 65/02* (2006.01)
*B29C 65/62* (2006.01)
*B29C 70/38* (2006.01)

(52) U.S. Cl.
USPC .......................................... 156/436; 156/511

(58) Field of Classification Search
USPC .................. 156/433, 436, 510, 511, 512
See application file for complete search history.

(56) References Cited

U.S. PATENT DOCUMENTS

| | | | |
|---|---|---|---|
| 3,810,805 A | | 5/1974 | Goldsworthy et al. |
| 4,292,108 A | * | 9/1981 | Weiss et al. ................... 156/259 |
| 5,809,805 A | | 9/1998 | Palmer et al. |
| 6,040,397 A | | 3/2000 | Hooper et al. |
| 6,585,842 B1 | | 7/2003 | Bompard et al. |
| 7,235,149 B2 | | 6/2007 | Taggart |

(Continued)

FOREIGN PATENT DOCUMENTS

| | | |
|---|---|---|
| EP | 1125728 A1 | 8/2001 |
| EP | 1473132 A2 | 11/2004 |

(Continued)

OTHER PUBLICATIONS

Notice of Allowance, dated Sep. 27, 2012, regarding U.S. Appl. No. 11/937,010, 9 pages.

(Continued)

*Primary Examiner* — Michael Tolin
(74) *Attorney, Agent, or Firm* — Yee & Associates, P.C.

(57) ABSTRACT

A method and apparatus for manufacturing. A fiber layer and a first porous bonding layer are formed to form a unidirectional lay-up of fibers. The unidirectional lay-up of fibers is heated under pressure to form a unidirectional composite tape. A first plurality of lengths of the unidirectional composite tape is laid down to build a first layer from the unidirectional composite tape. A second plurality of lengths of the unidirectional composite tape is laid down to build a second layer from the unidirectional composite tape on the first layer at a predetermined angle from the first layer. At least one of the first and second plurality of lengths of the unidirectional composite tape are slit while laying down the first and second plurality of lengths of the unidirectional composite tape. A composite fabric is formed from the first and second layer.

5 Claims, 7 Drawing Sheets

(56) References Cited

U.S. PATENT DOCUMENTS

| | | |
|---|---|---|
| 7,435,693 B2 | 10/2008 | Tsotsis et al. |
| 8,246,882 B2 | 8/2012 | Tsotsis |
| 2002/0192467 A1 | 12/2002 | Secrist et al. |
| 2004/0219855 A1 | 11/2004 | Tsotsis |
| 2005/0059309 A1 | 3/2005 | Tsotsis |
| 2005/0236093 A1 | 10/2005 | Taggart |
| 2005/0257887 A1 | 11/2005 | Tsotsis |
| 2006/0065352 A1 | 3/2006 | Keuchel |
| 2006/0154545 A1 | 7/2006 | Tsotsis et al. |
| 2006/0162143 A1 | 7/2006 | Nelson et al. |
| 2006/0289111 A1* | 12/2006 | Krogager et al. ............ 156/252 |
| 2008/0289743 A1 | 11/2008 | Tsotsis |
| 2009/0120562 A1 | 5/2009 | Tsotsis et al. |
| 2010/0003881 A1 | 1/2010 | Tsotsis |

FOREIGN PATENT DOCUMENTS

| | | |
|---|---|---|
| EP | 2058101 A1 | 5/2009 |
| FR | 2761380 A1 | 10/1998 |
| WO | 9921697 A1 | 5/1999 |
| WO | 2007015706 A1 | 2/2007 |

OTHER PUBLICATIONS

Notice of Allowance, dated Oct. 9, 2012, regarding U.S. Appl. No. 12/558,461, 9 pages.

EP Search Report dated Feb. 2, 2009 regarding Application No. EP08253598, 3 pages.

European Patent Office Communication dated Mar. 4, 2011 regarding Application No. EP08253598, 5 pages.

Tsotsis, "Interlayer Toughening of Composite Materials," Polymer Composites, vol. 30, Issue 1, Jan. 2009, pp. 70-86.

Tsotsis, "Method and Apparatus for Low-Bulk Toughened Fabrics for Low-Pressure Molding Processes," U.S. Appl. No. 12/558,461, filed Sep. 11, 2009, 46 pages.

Office Action dated Nov. 29, 2010 regarding U.S. Appl. No. 11/937,010, 13 pages.

Response to Office Action dated Feb. 28, 2011 regarding U.S. Appl. No. 11/937,010, 13 pages.

Final Office Action dated Apr. 22, 2011 regarding U.S. Appl. No. 111937,010, 16 pages.

Amendment Pursuant to Request for Continued Examination dated Jul. 22, 2011 regarding U.S. Appl. No. 11/937,010, 19 pages.

Office Action dated Aug. 4, 2011 regarding U.S. Appl. No. 11/937,010, 16 pages.

Response to Office Action dated Nov. 4, 2011 regarding U.S. Appl. No. 11/937,010, 17 pages.

Final Office Action dated Dec. 27, 2011 regarding U.S. Appl. No. 11/937,010, 13 pages.

Amendment Pursuant to Request for Continued Examination dated Mar. 27, 2012 regarding U.S. Appl. No. 11/937,010, 17 pages.

Notice of Allowance dated Jun. 12, 2012 regarding U.S. Appl. No. 111937,010, 10 pages.

Office Action dated Feb. 8, 2012 regarding U.S. Appl. No. 12/558,461, 16 pages.

Response to Office Action dated May 7, 2012 regarding U.S. Appl. No. 12/558,461, 19 pages.

Notice of Allowance dated Jun. 8, 2012 regarding U.S. Appl. No. 12/558,461, 14 pages.

* cited by examiner

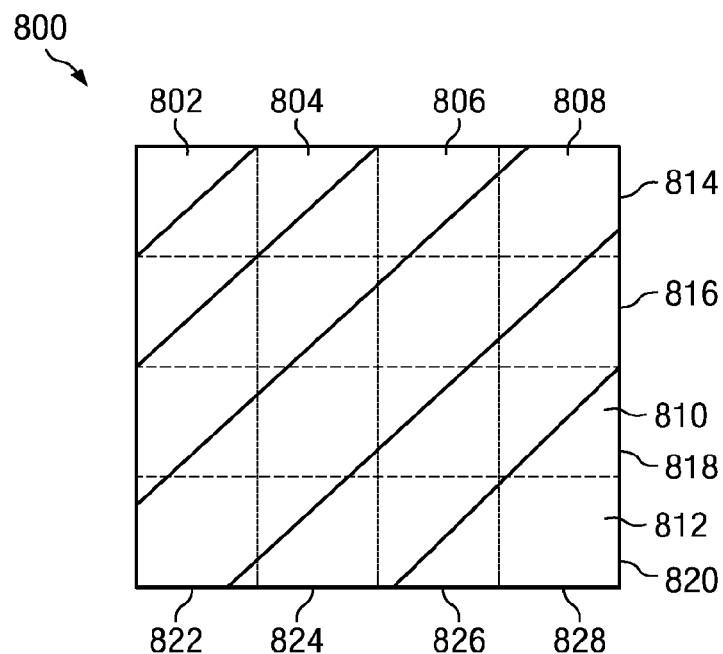
FIG. 8
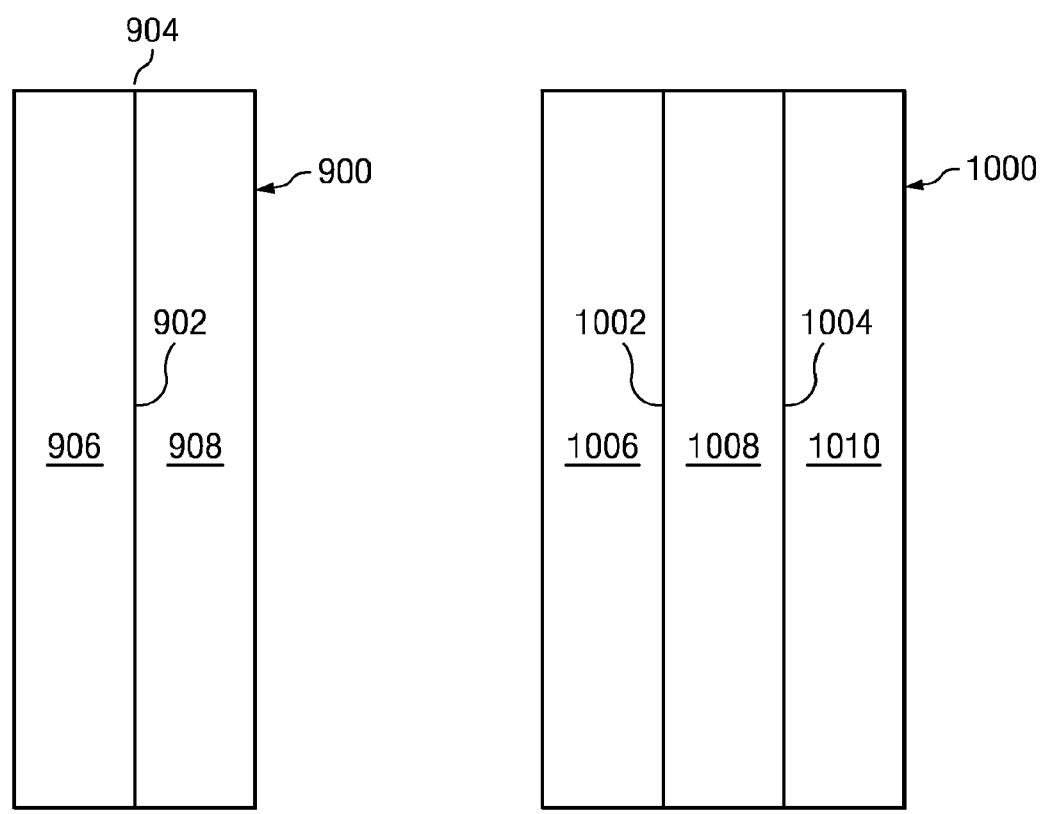
FIG. 9
FIG. 10

METHOD AND APPARATUS FOR LOW-BULK TOUGHENED FABRICS FOR LOW-PRESSURE MOLDING PROCESSES

CROSS-REFERENCE TO RELATED APPLICATION

This application is a divisional application of U.S. application Ser. No. 12/558,461, entitled "METHOD AND APPARATUS FOR LOW-BULK TOUGHENED FABRICS FOR LOW-PRESSURE MOLDING PROCESSES," filed Sep. 11, 2009, now U.S. Pat. No. 8,372,231, which is a Continuation-In-Part of U.S. application Ser. No. 11/937,010, entitled "METHOD AND APPARATUS FOR LOW-BULK TOUGHENED FABRICS FOR LOW-PRESSURE MOLDING PROCESSES," filed Nov. 8, 2007, now U.S. Pat. No. 8,361,262.

BACKGROUND INFORMATION

1. Field

The present disclosure relates generally to non-crimped fabrics and, in particular, to a method and apparatus for manufacturing low-bulk, non-crimped fabrics. Still more particularly, the present disclosure relates to a method and apparatus for creating composite materials from low-bulk, non-crimped fabrics.

2. Background

Aircraft are being designed and manufactured with greater and greater percentages of composite materials. Some aircraft may have more than 50 percent of their primary structure made from composite materials. Composite materials may be used in aircraft to decrease the weight of the aircraft. This decreased weight may improve payload capacities and fuel efficiencies. Further, composite materials may provide longer service life for various components in an aircraft.

Composite materials may be tough, lightweight materials created by combining two or more dissimilar components. For example, a composite material may include fibers and resins. The fibers and resins may be combined to form a cured composite material.

Further, by using composite materials, portions of an aircraft may be created in larger pieces or sections. For example, a fuselage in an aircraft may be created in cylindrical sections that may be put together to form the fuselage of the aircraft. Other examples may include, without limitation, wing sections joined to form a wing or stabilizer sections joined to form a stabilizer.

These composite components for aircraft may include composite materials such as, for example, without limitation, composite fabrics. The different components for an aircraft that may be created using composite materials include, for example, without limitation, a section of a fuselage, a wing panel, a wing rib, a spar, an aileron, a stabilizer, and other suitable components.

Currently used composite fabrics may be processed using a combination of heat, pressure, and vacuum in a tool, such as an autoclave. The particular part may be placed inside a bag in the autoclave. A vacuum may be applied to the bag to remove the air and volatile products. Heat and pressure may then be applied for curing. This type of process normally works well except, in some cases, a particular part may be too large for an autoclave or may require an expensive autoclave that is large enough to fit the part.

An alternative type of processing for composite components may be performed using manufacturing processes that do not require the use of an autoclave, such as those that use an oven. These types of processes may also be referred to as low-pressure molding processes.

Currently used processes for creating composite fabrics include, for example, using knitting machines that pull tows across an area and clamp those tows down at different orientations to make the desired fabric (e.g. U.S. Pat. No. 5,809,805). Tows are bundles of continuous fibers that are generally stored on spools and which are typically used to create the composite fabrics. An alternative to pulling tows across an area and clamping them down to produce fabrics may be to use pre-consolidated fabrics in which pick-and-place methods (e.g. U.S. Pat. No. 6,585,842) are employed to create these layers for the fabrics before they are knitted together.

These types of processes, however, may not have the desired quality, low bulk, or fiber spreading when producing composite components with low-pressure molding processes when an interlayer material is introduced between the plies. Accordingly, there is a need for a method and apparatus for minimizing inconsistencies in fabrics that overcomes the problems discussed above.

SUMMARY

In one advantageous embodiment, a method is present for manufacturing. A fiber layer and a first porous bonding layer are formed to form a unidirectional lay-up of fibers. The unidirectional lay-up of fibers is heated under pressure to form a unidirectional composite tape to substantially maintain the fibers in a desired configuration. A first plurality of lengths of the unidirectional composite tape is laid down to build a first layer from the unidirectional composite tape. A second plurality of lengths of the unidirectional composite tape is laid down to build a second layer from the unidirectional composite tape on the first layer at a predetermined angle from the first layer. At least one of the first plurality of lengths of the unidirectional composite tape and the second plurality of lengths of the unidirectional composite tape is slit while laying down the first plurality of lengths of the unidirectional composite tape and the second plurality of lengths of the unidirectional composite tape. A composite fabric is formed from the first layer and the second layer.

In another advantageous embodiment, an apparatus comprises a conveyor bed, a tape source, and a set of tape lay-down units. The tape source has tape comprising a first layer of a composite tape having a layer of fiber spread out to a selected thickness and a layer of porous bonding material melt-bonded onto the layer of fiber. The set of tape lay-down units is capable of laying down a set of tapes from the tape source on the conveyor bed at a set of angles to form a set of layers of tape for a composite fabric and capable of slitting the set of tapes as the set of tapes is laid onto the conveyor bed to form the set of layers of tape.

In yet another advantageous embodiment, a method is present for manufacturing. A fiber layer, a first porous bonding layer, and a second porous bonding layer are formed. The fiber layer is located between the first porous bonding layer and the second porous bonding layer to form a unidirectional lay-up of fibers. The unidirectional lay-up of fibers is heated under pressure to melt-bond the first porous bonding layer and the second porous bonding layer to the fiber layer to fix a position of fibers to form a unidirectional composite tape of desired thickness tape in which the fibers in the unidirectional composite tape are substantially maintained in a desired configuration. The unidirectional composite tape is slit to a desired width to form a slit unidirectional composite tape. A first plurality of lengths of the slit unidirectional composite tape is laid down to build a first layer from the composite tape in the multiaxial fabric machine. A second plurality of lengths of the slit unidirectional composite tape is laid down to build a second layer from the unidirectional composite tape on the first layer at a predetermined angle from the first layer in the multiaxial fabric machine. At least one of the first plurality of lengths of the unidirectional composite tape and the second plurality of lengths of the unidirectional composite tape is slit while laying down the first plurality of lengths of the unidirectional composite tape and the second plurality of lengths of the unidirectional composite tape in the multiaxial fabric machine. The first layer and the second layer are consolidated to form a continuous composite fabric in a continuous process. Portions of the continuous composite fabric are laid up on a tool in a form of a composite component. Resin is introduced into the portions of the continuous composite fabric. The portions of the continuous composite fabric are cured in the form of the composite component on the tool to form the composite component.

In a further advantageous embodiment, an apparatus comprises a conveyor bed, a set of tape spools, a set of tape lay-down units, and a stitching head. Each tape spool in the set of tape spools has tape comprising a first layer of a composite tape having a layer of fiber spread out to a selected thickness and a layer of porous bonding material melt-bonded onto the layer of fiber. The set of tape lay-down units is capable of laying down a set of tape from a tape source on the conveyor bed at a set of angles to form a set of layers of tape for a composite fabric. Each tape lay-down unit in the set of tape lay-down units comprises a tape head capable of laying the tape from a tape spool in the set of tape spools onto the conveyor bed, a moveable arm capable of positioning the tape head over the conveyor bed while the conveyor bed is moving, and a cutting unit capable of cutting slits in the tape as the tape is laid down on the conveyor bed. The stitching head is capable of connecting different layers within the composite fabric formed by the set of tape lay-down units.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 8 is an illustration of fabric in accordance with an advantageous embodiment;

FIG. 9 is an illustration of a length of tape in accordance with an advantageous embodiment;

FIG. 10 is an illustration of a length of tape with slits in accordance with an advantageous embodiment.

DETAILED DESCRIPTION

Figure 1:
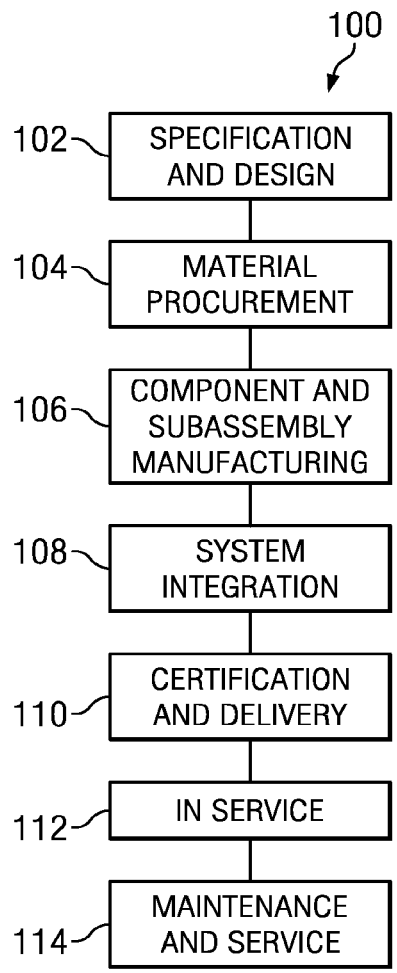
FIG. 1 is an illustration of an aircraft manufacturing and service method in accordance with an advantageous embodiment.
Figure 2:
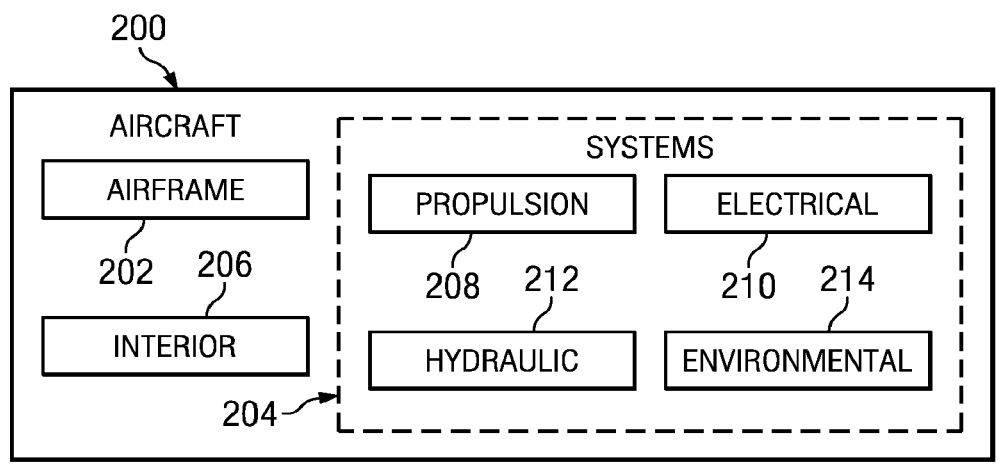
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of or reduce the cost of aircraft 200.

The different advantageous embodiments may be applied to manufacturing or forming composite components. More specifically, the different advantageous embodiments may be applied to processes in which composite components may be formed through low-pressure curing processes. Low-pressure curing, in these advantageous embodiments, may be a process in which normal atmosphere pressure may be present in curing a composite component. This type of process may be in contrast to curing composite components using autoclaves, in which additional pressure may be added.

The different advantageous embodiments recognize that the currently used processes for creating fabrics may not have the desired quality, low bulk, or fiber spreading when producing composite components with low-pressure molding processes when an interlayer material is introduced between the plies.

The different advantageous embodiments recognize and take into account a number of different considerations. For example, the different advantageous embodiments recognize that current fabrics and methods for manufacturing fabrics containing interlayer materials between layers or plies of different fiber orientation may lead to undesired dislocations of layers with low-pressure molding processes. These dislocations may cause undesirable gaps and overlaps.

Interlayer materials may include, for example, without limitation, spun-bonded, spun-laced, and/or staple-based nonwovens, in addition to woven materials. For example, without limitation, the different advantageous embodiments recognize that the fabrics with interlayer materials currently used may have too much bulk and/or thickness to make composite components that meet design specifications. For example, without limitation, the presence of undesired gaps between tows may contain resin-rich areas after part infusion and cure. These types of inconsistencies may be undesirable in creating composite parts. These types of issues also may be present in prepreg build ups.

Further, the different advantageous embodiments also recognize that this bulk may result in lower fiber-volume fractions and excess weight in the composite component. These low-pressure molding processes may not provide pressure needed to sufficiently compress fibers in the composite fabrics to a desired finished part thickness.

Thus, the different advantageous embodiments provide a method and apparatus for manufacturing, in which a fiber layer and a bonding layer may be used to form a unidirectional lay-up of fibers. The bonding layer is a porous bonding layer. The unidirectional lay-up of fibers is heated along with the porous bonding layer under pressure to form a unidirectional composite tape with few or controlled gaps between adjacent fiber tows.

A first layer is built from the unidirectional composite tape and the second layer is built from the unidirectional composite tape on the first layer at a predetermined angle from the first layer to form a composite fabric. In the illustrative embodiments, a second bonding layer may be present such that the fiber layer may be located between the two bonding layers in forming the unidirectional composite tape such that the two bonding layers are fully melt-bonded to the fiber, thereby reducing their bulk and fixing the spreading and spacing of the fibers.

The portions of the composite fabric may be laid up on a tool in a form of a composite component. The composite fabric may be cured on the tool to form the composite component in these examples.

Additionally, the different advantageous embodiments recognize and take into account that when fabric formed from lengths of tape are laid or placed onto a surface or tool, these lengths of tape in the fabric may not provide sufficient flexibility that may be required to lay-up composite parts on various surfaces and tools. In other words, fabric produced from the different advantageous embodiments may be more difficult to lay-up on tools that may have highly curved or contoured parts.

Thus, one or more of the different advantageous embodiments may form slits in the composite tape as the composite tape is laid down to form a composite fabric. For example, as a length of composite tape is laid down to build a layer, the length of composite tape may be cut to form a number of slits along the length of the composite tape. In these examples, "a number of", with reference to an item, means one or more items. For example, a number of slits is one or more slits. The number of slits may be along an entire length of composite tape.

These slits may improve the flexibility of the composite fabric constructed from these composite tapes. This improved flexibility also may be referred to as improved drapability. In the different advantageous embodiments, the cutting of slits occurs after the melt-bonding has occurred to form the composite tapes. The slitting also may improve infusion performance.

Figure 3:
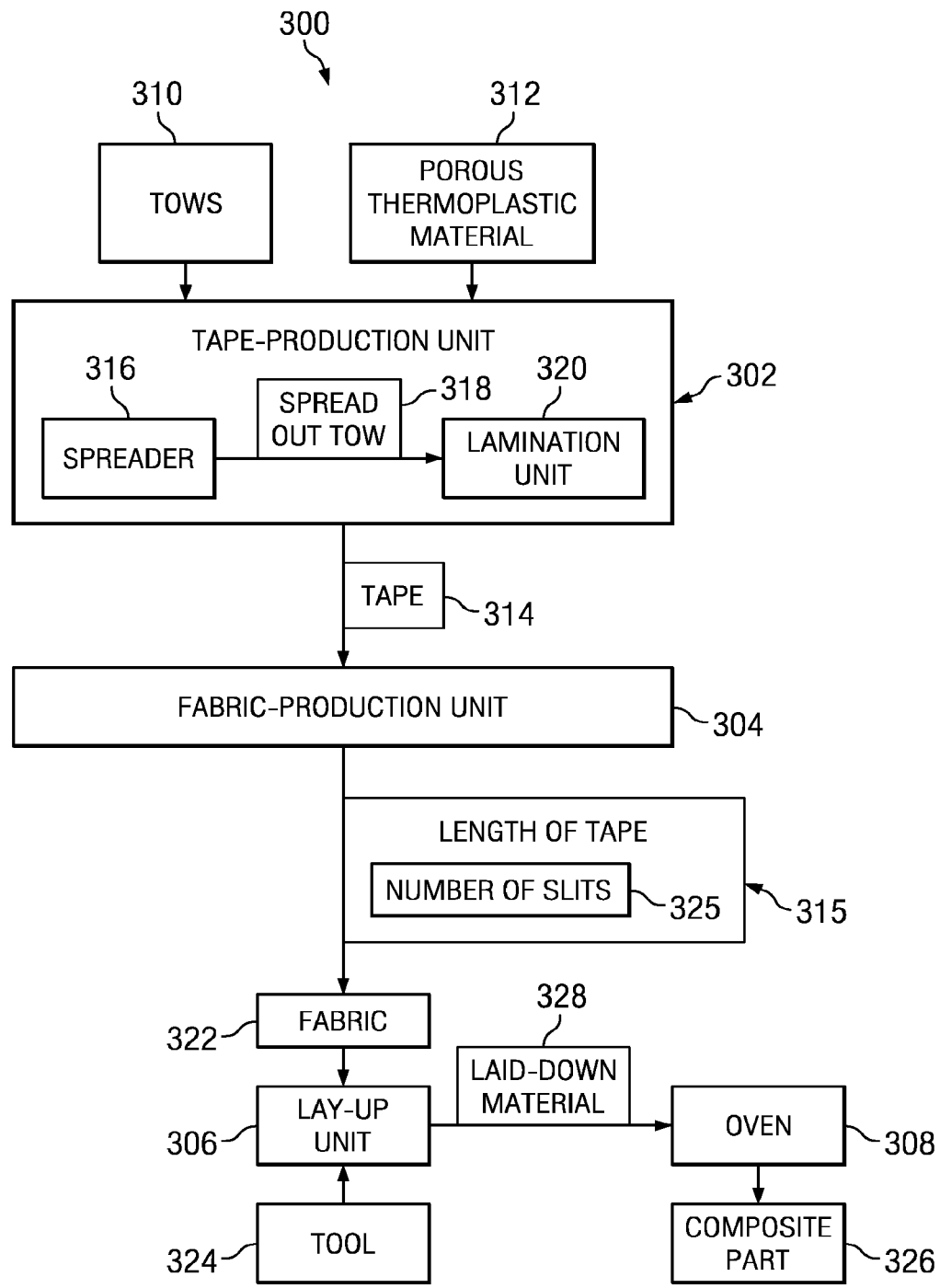
FIG. 3 is an illustration of a manufacturing system in accordance with an advantageous embodiment.

With reference now to FIG. 3, an illustration of a manufacturing system is depicted in accordance with an advantageous embodiment. In this illustrative example, manufacturing system 300 includes tape-production unit 302, fabric-production unit 304, lay-up unit 306, and oven 308.

Tape-production unit 302 uses tows 310 and porous thermoplastic material 312 to generate tape 314. A tow is typically an untwisted bundle of continuous filaments or fibers. Tows may be designated by the number of fibers that they contain. For example, a 12K tow contains around twelve thousand fibers. A tow may be located on spools. Different spools in tows 310 may contain a different number of filaments or fibers. Tape-production unit 302 pulls a tow from tows 310 and pull the bundle through spreader 316. Spreader 316 "spreads" fibers within a bundle from tows 310 to a desired width to form spread out tow 318. The desired width may be, for example, without limitation, three to four inches, or some other suitable width. Spread out tow 318 is processed using lamination unit 320.

Lamination unit 320 places a layer of porous thermoplastic material 312 on each side of spread out tow 318 to form bonding layers. Lamination unit 320 applies heat and pressure to porous thermoplastic material 312 and spread out tow 318. The application of heat and pressure generally compacts or reduces the thickness of spread out tow 318 to a desired thickness. This type of process also may be referred to as melt-bonding. Porous thermoplastic material 312 is a melt-bondable thermoplastic material.

In other words, the layer on each side of spread out tow 318 may be melted, bonded, or attached to the fibers in spread out tow 318 in a manner that the fibers in spread out tow 318 may not move with respect to each other. The melt-bonding or attachment of fibers in the tows in tape 314 stabilizes it to maintain a desired thickness and consistency. As a result, the fibers may not expand to a thickness that is greater than a desired thickness at a later time when fabric 322 may be made from tape 314 by fabric-production unit 304. In other words, the melt-bonding may be performed using lamination unit 320 to minimize or eliminate undesired bulk in tape 314.

Thus, tape 314 may have fully melt-bonded porous thermoplastic material 312. However, the melt-bonding should preferably be performed to minimize or eliminate smearing or calendaring of the bonding layer such that the filamentary geometry of the bonding layer fabric remains intact. The filaments in porous thermoplastic material 312 may be melted on top, but generally should not be melted into the bundles themselves.

Tape-production unit 302 may be implemented using any commercially available tape-production unit with modifications to perform melt-bonding of porous thermoplastic material 312 to spread out tow 318 to generate tape 314 with the desired characteristics. In these examples, tape-production unit 302 is implemented using a conventional tape-production system adapted to produce tape 314. For example, a conventional laminating machine with a horizontal oven may be adapted for use as tape-production unit 302.

In the depicted examples, tape 314 is a composite tape. More specifically, tape 314 may be a unidirectional composite tape.

Fabric-production unit 304 may produce fabric 322 from tape 314. Fabric-production unit 304 may be implemented using any standard fabrication production unit. A non-limiting example is a knitting machine. A knitting machine may be modified to use tape 314 instead of tows 310, which is normally used to create a fabric.

Instead, fabric-production unit 304 may use rolls of tape 314 to lay down material for fabric 322. Tape 314 may be laid down by fabric-production unit 304 in different angles with respect to each other to generate fabric 322. Fabric-production unit 304 pulls tape 314 onto a surface and cuts tape 314 into appropriate sizes, generally the width of the moving bed of the warp-knitting machine being used to produce the fabric. Length of tape 315 is pulled from tape 314 onto the surface and placed onto multiple orientations and knitted together to form fabric 322. In this manner, the different advantageous embodiments use tape 314 to create fabric 322, rather than creating fabric 322 directly from tows 310.

Additionally, fabric-production unit 304 also may cut number of slits 325 in length of tape 315 from tape 314. Number of slits 325 may be cut continuously along length of tape 315. In other embodiments, multiple slits may be cut parallel to each other. Further, in some embodiments, a slit may not be continuous along length of tape 315. For example, a slit may begin at one portion of length of tape 315, stop, and then begin again in another portion along length of tape 315.

Thereafter, fabric 322 is used by lay-up unit 306 with tool 324 to create composite part 326. Tool 324 may be, for example, without limitation, a mold on which portions of fabric 322 may be laid up into a form for composite part 326. Fabric 322 is laid down onto tool 324 by lay-up unit 306 for composite part 326. After fabric 322 has been laid down onto tool 324 to form laid-down material 328, laid-down material 328 on tool 324 is placed into oven 308 for curing.

In these examples, oven 308 may be a low-pressure oven, in which additional pressure is typically unnecessary to create composite part 326. With this type of curing, concerns with respect to the thickness of fabric 322 may not be a concern because of the stabilized material in tape 314 used to create fabric 322. In contrast, with currently available fabrics and processes to create fabrics that include interlayer materials between plies, the bulk or thickness of layers within the fabric may not meet designs or specifications when low-pressure curing processes are used. As a result, pressurized curing processes provided through autoclaves may be avoided in producing fabrics with desired bulk and/or thicknesses.

Additionally, number of slits 325 cut into length of tape 315 may increase the flexibility of fabric 322 when fabric 322 is used by tool 324 to create composite part 326. Number of slits 325 may allow strips formed by number of slits 325 in length of tape 315 in fabric 322 to slide relative to each other. Length of tape 315 also may slide more easily relative to other lengths of tape in fabric 322.

Number of slits 325 provides increased flexibility within fabric 322. This increased flexibility allows for easier lay-up of fabric 322 on tool 324 to create composite part 326. This increased flexibility or drapability also results in reduced wrinkling and/or other undesired inconsistencies in fabric 322 when fabric 322 is laid up on tool 324. Further, number of slits 325 also increases the infusion performance of resins into fabric 322 during curing. Number of slits 325 provides additional paths through which resin may flow in fabric 322. These additional paths result in increased fabric permeability for fabric 322. This increased fabric permeability increases the infusion performance of resins into fabric 322.

Figure 4:
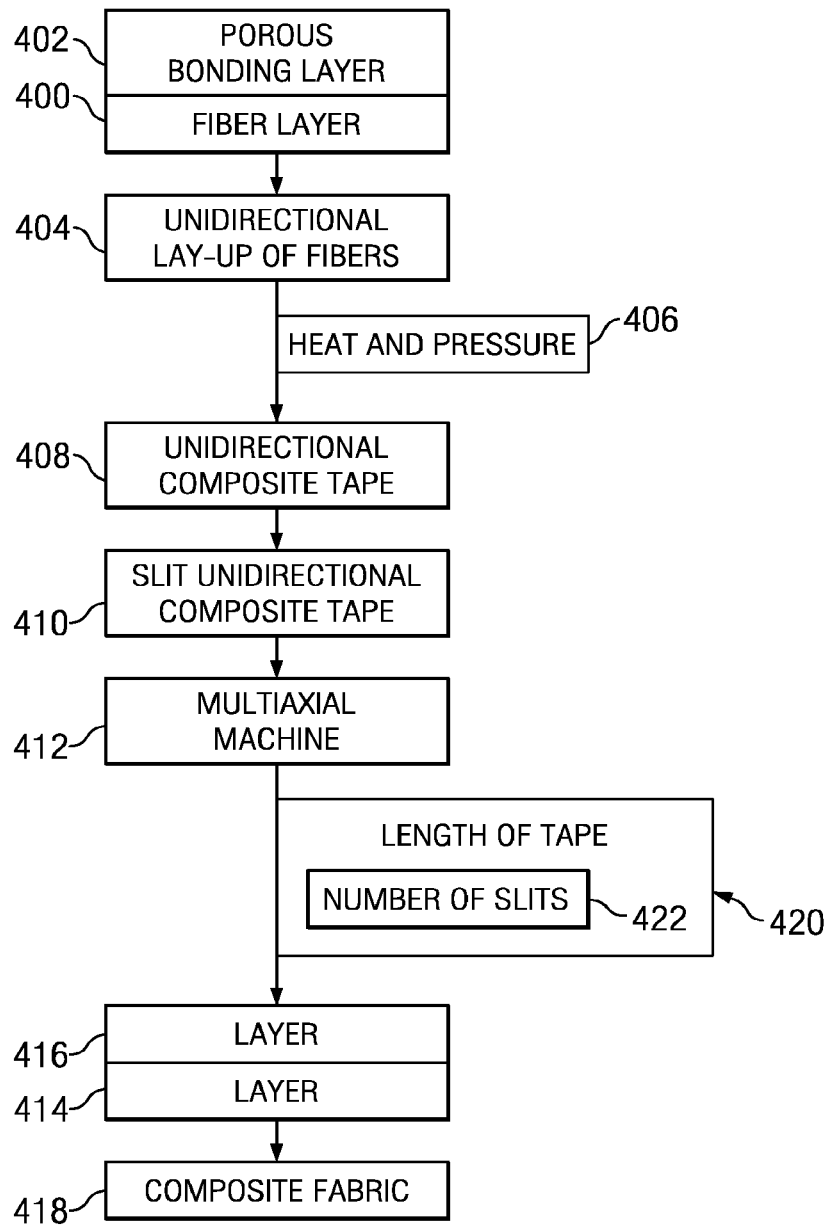
FIG. 4 is an illustration of a block diagram for manufacturing a composite fabric in accordance with an advantageous embodiment.

With reference now to FIG. 4, an illustration of a block diagram for manufacturing a composite fabric is depicted in accordance with an advantageous embodiment. In this example, the process forms fiber layer 400 and porous bonding layer 402 to form unidirectional lay-up of fibers 404. In other words, unidirectional lay-up of fibers 404 are arranged in one direction or orientation. In this illustrative embodiment, heat and pressure 406 is applied to unidirectional lay-up of fibers 404 to form unidirectional composite tape 408. Unidirectional composite tape 408 is slit to a desired width to form slit unidirectional composite tape 410. Slit unidirectional composite tape 410 is then loaded into multiaxial machine 412. In these illustrative examples, slit unidirectional composite tape 410 is a continuous length of unidirectional composite tape having a selected width.

Multiaxial machine 412 builds layer 414 at a first angle and then builds layer 416 at a second angle on layer 414 at a first angle. These two layers form composite fabric 418. In these advantageous embodiments, multiaxial machine 412 pulls length of tape 420 from slit unidirectional composite tape 410 to build layer 414 and layer 416. Further, in the different advantageous embodiments, number of slits 422 is cut into length of tape 420 used to build layer 414 and/or layer 416. Number of slits 422 is cut down length of tape 420. For example, length of tape 420 with a single slit running down all of length of tape 420 forms two strips. Two slits cut along length of tape 420 forms three strips from length of tape 420. Further, multiple slits may be cut such that portions of length of tape 420 have a slit, while other portions do not.

Although only two layers are shown in this example, additional layers such as, for example, without limitation, five, seven, and ten may be used, depending on the particular implementation. In these examples, production of composite fabric 418 is performed or consolidated continuously.

Figure 5:
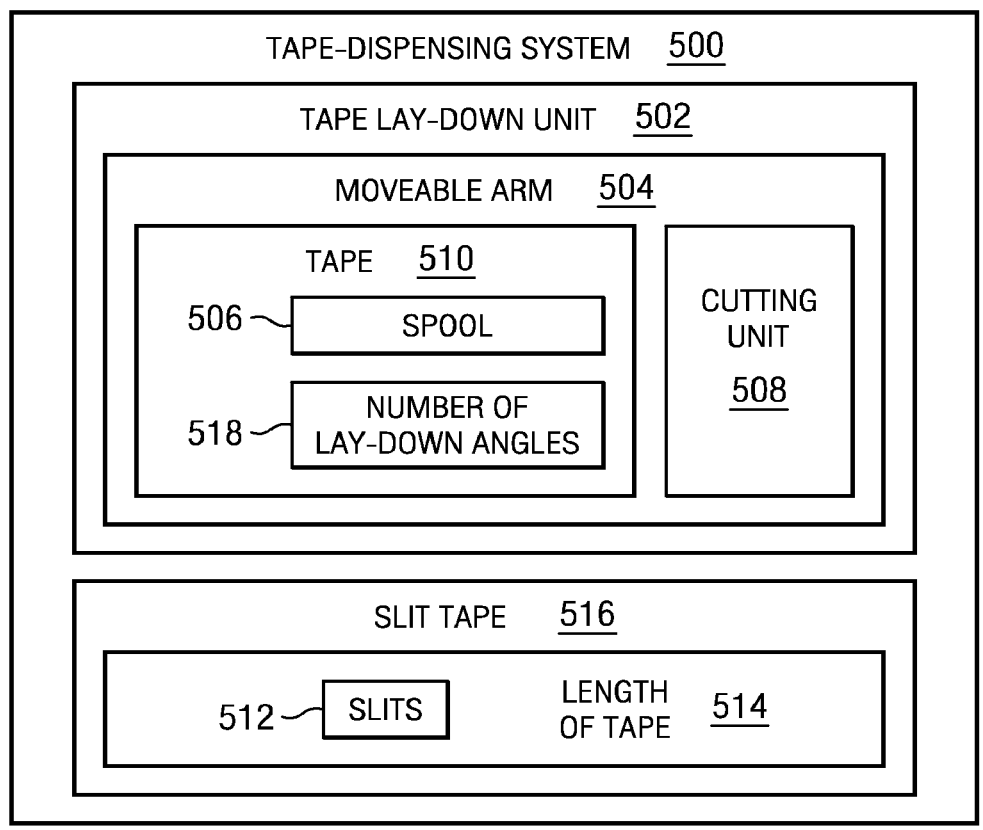
FIG. 5 is a tape-dispensing system in accordance with an advantageous embodiment.

Turning now to FIG. 5, a tape-dispensing system is depicted in accordance with an advantageous embodiment. In this illustrative example, tape-dispensing system 500 may include tape lay-down unit 502. Tape lay-down unit 502 comprises moveable arm 504, spool 506, cutting unit 508, and/or other suitable components. In these examples, tape 510 is located on spool 506. Tape 510 is a composite tape such as, for example, tape 314 in FIG. 3 and slit unidirectional composite tape 410 in FIG. 4.

Tape lay-down unit 502 is used in a fabrication unit such as, for example, fabric-production unit 304 in FIG. 3 and multiaxial machine 412 in FIG. 4. Tape lay-down unit 502 may dispense tape 510 to build layers, such as layer 414 and layer 416 to produce composite fabric 418 in FIG. 4. In these illustrative examples, cutting unit 508 may be controlled to selectively cut slits 512 into length of tape 514 dispensed from tape 510 on spool 506 to form slit tape 516.

In these illustrative examples, cutting unit 508 is part of tape lay-down unit 502. As tape 510 is dispensed by tape lay-down unit 502, tape 510 passes through cutting unit 508 to form slit tape 516. Slit tape 516 may be drawn across multiaxial machine 412 in FIG. 4 and be cut to a desired length. In these depicted examples, tape 510 may be dispensed by tape lay-down unit 502 at number of lay-down angles 518 for tape 510.

Figure 6:
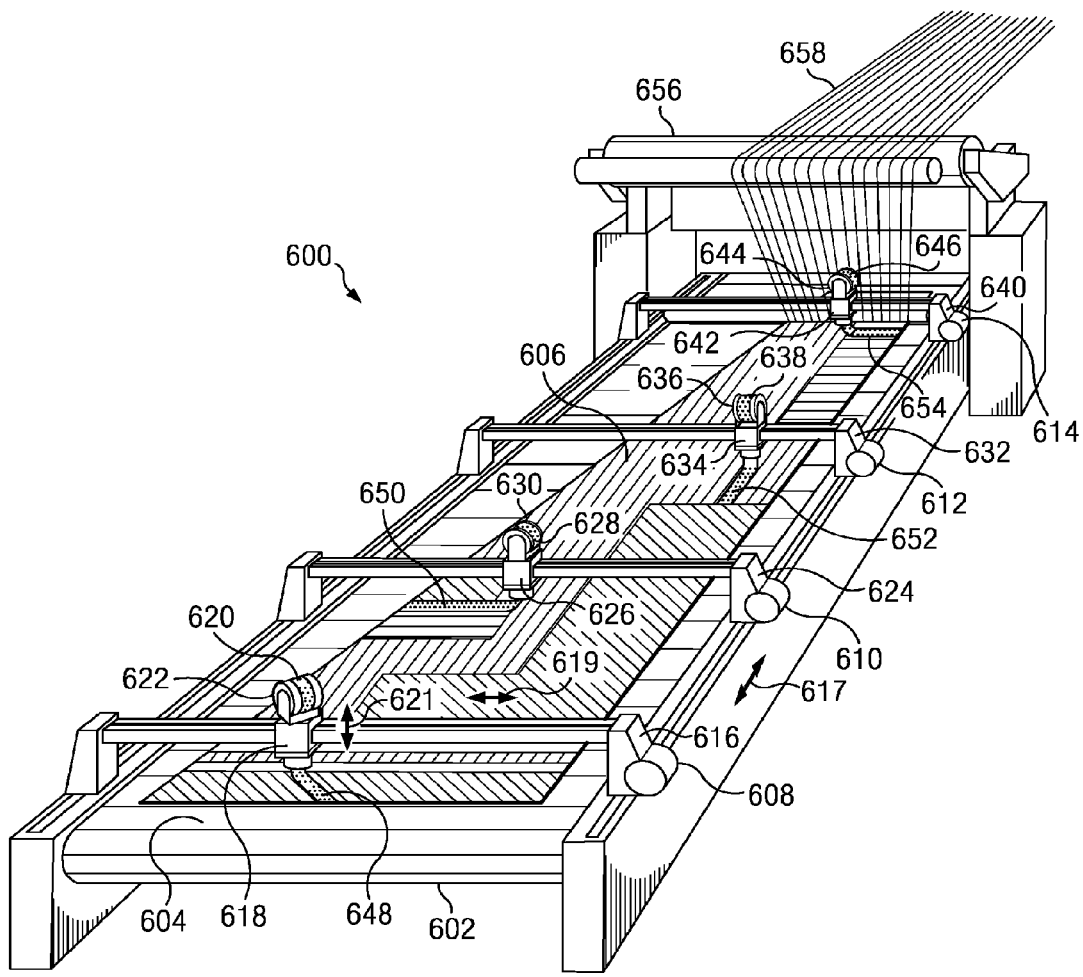
FIG. 6 is an illustration of a fabric-production unit in accordance with an advantageous embodiment.

With reference now to FIG. 6, an illustration of fabric-production unit 600 is depicted in accordance with an advantageous embodiment. In this illustrative example, fabric-production unit 600 is an example of fabric-production unit 304 in FIG. 3. In these examples, fabric-production unit 600 is a multiaxial machine. A multiaxial machine is a machine that is capable of laying down materials in different orientations to manufacture a fabric.

Fabric-production unit 600 includes conveyor bed 602, which provides surface 604 for forming fabric 606. Fabric-production unit 600 also includes a set of tape lay-down units, tape lay-down units 608, 610, 612, and 614. The phrase "a set", as used herein, refers to one of more items. For example, a set of tape lay-down units is one or more tape lay-down units. As another example, a set of tape spools is one or more tape spools.

In these examples, tape lay-down units 608, 610, 612, and 614 may lay down tape for fabric 606 in different orientations. These different units may lay down tape for different layers or plies of fabric 606. Tape lay-down unit 608 includes moveable arm 616, which may move along an X-axis as shown by line 617 in this example. Tape head 618 may move along a Y-axis along moveable arm 616 as shown by line 619. Further, tape head 618 may be moveable up and down as shown by line 621 and may be rotatable around a Z-axis or around line 621. This rotation of tape head 618 may occur to change the orientation at which tape 620 on spool 622 may be laid down on conveyor bed 602 to form fabric 606. A spool that holds tape also may be referred to as a tape spool.

Tape lay-down unit 610 also includes moveable arm 624, tape head 626, and spool 628 with tape 630. In a similar fashion, tape lay-down unit 612 includes moveable arm 632, tape head 634, and spool 636 with tape 638. Tape lay-down unit 614 includes moveable arm 640, tape head 642, and spool 644 with tape 646. The different tape lay-down units illustrated in this figure may be implemented using tape lay-down unit 502 in FIG. 5.

Further, each of these tape lay-down units may change the orientation at which tape may be laid down within the same layer, as well as in different layers. In this example, tape lay-down unit 608 may create layer 648 while tape lay-down unit 610 creates layer 650. Tape lay-down unit 612 may create layer 652, while tape lay-down unit 614 creates layer 654, in these examples.

As discussed above, each of the tape lay-down units may be configured to selectively cut slits in lengths of tape being laid down to create the different layers, such as layer 648, layer 650, layer 652, and layer 654. Of course, in other embodiments, some lengths of tape being laid down may have no slits. Other lengths of tape may have a different number of slits compared to other lengths of tape being laid down for the same layer or fabric.

In addition, fabric-production unit 600 also may include stitching head 656, which may connect the different layers to each other using threads 658 to consolidate the layers to form the fabric. In these examples, threads 658 may be used to generate low-density stitching to hold the different layers of fabric 606 to each other. In other illustrative embodiments, the different layers within fabric 606 may be connected to each other through other mechanisms such as, for example, without limitation, tacking with or without heat.

In these examples, fabric-production unit 600 includes four tape lay-down units. Of course, in other advantageous embodiments, other numbers of tape-lay-down units may be used. For example, three, six, eight, or some other suitable number of tape lay-down units may be employed, depending on the particular implementation. Fabric-production unit 600 may be implemented using any conventional tools with modifications. For example, without limitation, fabric-production unit 600 may be implemented using a Copcentra MAX 5 CNC from LIBA Maschinenfabrik GmbH modified to use unidirectional composite tape instead of spread tows obtained from creels of individual tows.

Figure 7:
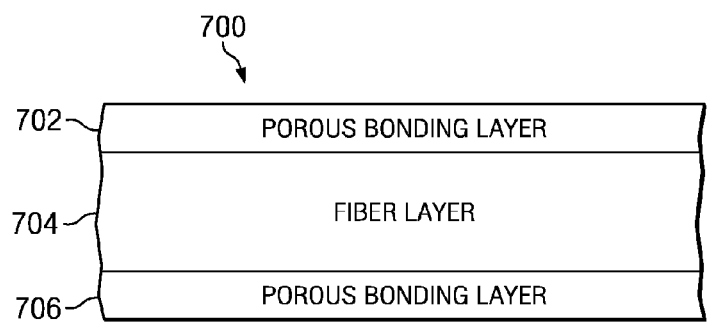
FIG. 7 is an illustration of a cross-sectional view of tape in accordance with an advantageous embodiment.

With reference now to FIG. 7, an illustration of a cross-sectional view of tape 700 is depicted in accordance with an advantageous embodiment. In this example, tape 700 includes porous bonding layer 702, fiber layer 704, and porous bonding layer 706. Tape 700 is an example of tape 314 in FIG. 3 that may be produced using tape-production unit 302 in FIG. 3. Fiber layer 704, in these examples, is formed from spreading the fibers from a tow to form a spread out tow, such as spread out tow 318 in FIG. 3. The materials for fiber layer 704 may be, for example, without limitation, carbon, fiberglass, boron, basalt, viscose (e.g. Rayon®), refractory oxides (alumina-based (e.g. Nextel®) or zirconia-based), silicon carbide, aramid (e.g. Kevlar® or Twaron®), polybenzoxazole (e.g. Zylon®), or any other suitable material.

In this example, porous bonding layer 702 may be formed using a material such as, for example, without limitation, a melt-bondable thermoplastic, a porous thermoplastic material, polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyethertherketone, polyarylamide, polyketone, polyphthalamide, polyphenylenether, polybutylene terephthalate, polyethylene terephthalate, or any other suitable material. Of course, porous bonding layers 702 and 706 may be formed using any porous material that may bond with fiber layer 704.

In the different advantageous embodiments, porous thermoplastic materials such as, for example, without limitation, veils of non-woven or woven thermoplastic fibers may be used. Of course, any material capable of bonding to fiber layer 704 may be used in the different advantageous embodiments. These bonding layers may be porous layers, such that resins applied to tape 314 or a fabric manufactured from tape 314 in FIG. 3 may flow into and/or around fiber layer 704 during curing after the fabric from which tape 700 is made. Porous bonding layer 706 may be formed using the same type of material.

Tape 700 may be processed by applying heat pressure to these layers to bond porous bonding layer 702 and porous bonding layer 706 to fiber layer 704. In these examples, melt-bonding is used. The heat and pressure may be applied to tape 700 to compress fiber layer 704 to a desired thickness. Additionally, the bonding of porous bonding layer 702 and porous bonding layer 706 to fiber layer 704 may occur in a manner that prevents or reduces fibers within fiber layer 704 from expanding or "springing back" to a prior thickness present before the application of heat and pressure.

In other words, the pressure and heat applied to form tape 700 may substantially maintain fibers in fiber layer 704 in a desired configuration. This desired configuration may be, for example, without limitation, fixing the fibers in places to eliminate or control gaps between adjacent fiber tows. The desired configuration also may be, for example, without limitation, maintaining a thinner thickness of the fiber as compared to the fiber prior to processing. Further, the fiber also may have a particular width from being spread out during processing that may be substantially maintained. The fiber layer may be spread out to create gaps or slits between adjacent fiber tows within a desired range prior to melt-bonding.

Tape 700 may have a thickness of around 0.30 millimeters. After applying heat and pressure, tape 700 may have a thickness of around 0.20 millimeters. This thickness is presented as one non-limiting example, and other thicknesses may be used, depending on the implementation. For example, a unidirectional fabric may have an unconsolidated thickness of around 0.25 to around 0.30 millimeters prior to the application of heat and pressure instead of around a 0.20 millimeters thickness that is desired.

The porous bonding layers may each be between around 10 to around 100 microns prior to the application of heat and pressure, which will reduce their thickness by around 50 percent to around 90 percent. Only the porous bonding layers generally experience a change in thickness during this process as the structural fibers to which they are melt-bonded will typically not melt at the temperatures required to melt-bond the porous layers. Although two bonding layers are shown in these examples, a single bonding layer may be used, depending on the implementation.

Turning now to FIG. 8, an illustration of fabric 800 is depicted in accordance with an advantageous embodiment. In this example, fabric 800 is an example of fabric 322, which may be used to manufacture composite part 326 in FIG. 3. In this example, fabric 800 is manufactured from tape, such as tape 314 in FIG. 3. Sections 802, 804, 806, 808, 810, and 812 are formed from strips of tape that may be pulled and cut from tape 314 in FIG. 3. These sections may be in a different orientation from sections 814, 816, 818, and 820, which are sections shown by the dashed lines. In this example, yet another layer or ply is formed from sections 822, 824, 826 and 828, which are shown by dotted lines. These sections may be in another orientation with respect to the other sections.

In this example, the orientations of sections 802, 804, 806, 808, 810, and 812 may be around 45 degrees from sections 814, 816, 818, and 820. In this example, sections 822, 824, 826, and 828 are around 90 degrees from sections 814, 816, 818, and 820. In other advantageous embodiments, additional layers of tape may be placed onto the depicted layers for fabric 800. These layers may be at different orientations with respect to the presently depicted layers.

Three layers or plies of tape are shown in fabric 800 in this example. In other advantageous embodiments, other numbers of layers may be used. For example, two layers, five layers, and/or eight layers may be used for fabric 800. In these different examples, the different sections in the layers may be connected to each other. Further, the different layers illustrated also may be connected to each other. These different connections may be made using a tool, such as fabric-production unit 304 in FIG. 3. In particular, as a non-limiting example, a knitting tool may be used to produce fabric 800.

With reference now to FIG. 9, an illustration of a length of tape is depicted in accordance with an advantageous embodiment. In this illustrative example, length of tape 900 is a composite tape and is dispensed from a tape head and a tape lay-down unit. In these examples, the composite tape is a unidirectional composite tape. Length of tape 900 has a width, a length, and a thickness. Length of tape 900 has slit 902. Slit 902 is formed down middle 904 of length of tape 900. In this example, slit 902 is a continuous slit forming strip 906 and strip 908 for length of tape 900.

Turning now to FIG. 10, an illustration of a length of tape with slits is depicted in accordance with an advantageous embodiment. In this illustrative example, length of tape 1000 is another example of a length of tape that may be laid down by a tape lay-down unit. Length of tape 1000 includes slits 1002 and 1004. These slits both run the entire length of length of tape 1000. Slits 1002 and 1004 form strips 1006, 1008, and 1010 from length of tape 1000.

The illustration of tape with slits in FIGS. 9 and 10 are not meant to imply physical or architectural limitations to the manner in which slits may be formed in tape. These illustrations are merely provided to illustrate some of the different configurations of slits that may be generated by a tape lay-down unit when a tape is being laid down to build a layer for a composite fabric.

Figure 11:
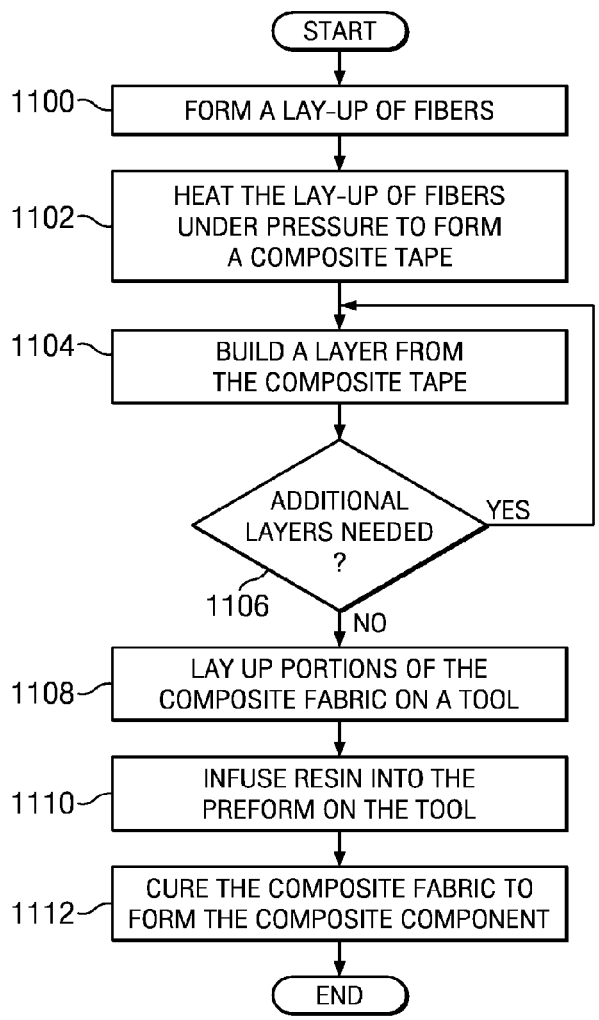
FIG. 11 is an illustration of a flowchart of a process for manufacturing in accordance with an advantageous embodiment.

With reference now to FIG. 11, an illustration of a flowchart of a process for manufacturing is depicted in accordance with an advantageous embodiment. The process illustrated in FIG. 11 may be implemented in a manufacturing system, such as manufacturing system 300 in FIG. 3.

The process begins by forming a lay-up of fibers (operation 1100). The lay-up of fibers may include a fiber layer located between two porous bonding layers. In some embodiments, a single porous bonding layer may be used. The lay-up of fibers may be heated under pressure to form a composite tape (operation 1102). The pressure may be applied to compact or spread out the fibers to around a desired thickness. The heat may be applied to melt the porous bonding layer or cause the porous bonding layer to adhere to the fibers in the fiber layer. This bonding or attachment may be such that the fibers in the fiber layer remain in a compacted state that has a thickness of around the desired thickness.

The processing of this lay-up of fibers may be performed such that the porosity in the bonding layer may be maintained to allow for resins to enter and combine with fibers in the fiber layer during curing of this material when used in a fabric to form a composite component. This lay-up of fibers forms the composite tape.

Thereafter, a layer may be built from the composite tape (operation 1104). This layer forms one layer for a fabric. The layer in the fabric also may be referred to as a ply. The layer may be laid down at a selected orientation. This orientation may be different from other layers that may be used to form the fabric. For example, one layer may be placed at a zero degree angle, while another layer is placed at a 45 degree angle. Yet another layer may be placed at a 90 degree angle, and another layer may be placed at a minus 45 degree angle. These angles may be with respect to a selected reference. The reference may be with respect to the surface on which the fibers are being placed.

A determination is made as to whether additional layers are needed (operation 1106). If additional layers are needed, the process returns to operation 1104. This determination may be made based on how many layers have been placed or built up to form a layer or ply in the fabric as compared to the desired number of layers.

Once additional layers are no longer needed for the fabric in step 1106, the process may lay up portions of the composite fabric on a tool (operation 1108). This tool may be, for example, without limitation, a mold on which portions of the fabric are placed. This mold may have the shape of the composite component to be manufactured. The composite fabric does not yet contain resin to form a finished part after infusion and curing. Resin may then be infused into the preform on the tool (operation 1110).

After the portions of the composite fabric have been laid up on the tool, the composite fabric on the tool may be cured to form the composite component (operation 1112), with the process terminating thereafter. In these examples, the composite component may be cured using low pressure in which the tool or mold may not need to be placed into an autoclave.

Figure 12:
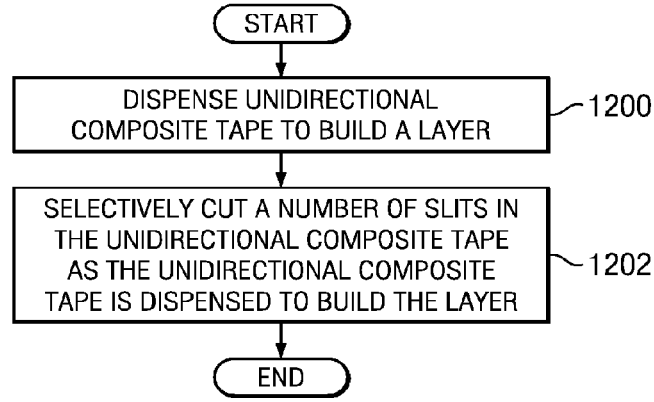
FIG. 12 is an illustration of a flowchart of a process for laying down a tape to form a layer for a fabric in accordance with an advantageous embodiment.

Turning now to FIG. 12, an illustration of a flowchart of a process for laying down a tape to form a layer for a fabric is depicted in accordance with an advantageous embodiment. The process illustrated in FIG. 12 may be implemented as part of operation 1104 in FIG. 11.

The process begins by dispensing unidirectional composite tape to build a layer (operation 1200). The process selectively cuts a number of slits in the unidirectional composite tape as the unidirectional composite tape is dispensed to build the layer (operation 1202), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a method and apparatus for manufacturing. A fiber layer and a porous bonding layer may be formed to form a unidirectional lay-up of fibers. The unidirectional lay-up of fibers may be heated under pressure to form a unidirectional composite tape. A first layer may be built from the unidirectional composite tape, and a second layer may be built from the unidirectional composite tape on the first layer at a predetermined angle from the first layer to form a composite fabric.

Portions of the composite fabric may be laid up in the tool in the form of the composite component. The composite fabric on the tool may be cured to form the composite component.

As a result, the different advantageous embodiments provide an ability to lay up composite components in sizes that may not fit into many autoclaves. Additionally, purchasing larger and more expensive autoclaves also may be unnecessary using the fabric manufactured under the different advantageous embodiments to produce composite components. The different advantageous embodiments provide a composite fabric that generally has a thickness of around the desired thickness for laying up composite components. As a result, pressure and heat needed to consolidate the fabric to a desired thickness is not necessary.

The description of the different advantageous embodiments have been presented for purposes of illustration and description, and it is not intended to be exhaustive or limited to the embodiments in the form disclosed. Many modifications and variations will be apparent to those of ordinary skill in the art. For example, the different advantageous embodiments are described with respect to manufacturing composite components for aircraft. Some advantageous embodiments may be applied to producing composite components for other items.

For example, without limitation, the composite fabric in the different embodiments may be used to produce composite components for spacecraft, submarines, cars, trucks, buildings, and ships. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a conveyor bed;
a tape source having tape comprising a first layer of a composite tape having a layer of fiber spread out to a selected thickness and a layer of porous bonding material melt-bonded onto the layer of fiber to form a unidirectional composite tape; and
a set of tape lay-down units configured to lay down a set of tapes from the tape source on the conveyor bed at a set of angles to form a set of layers of tape for a composite fabric and configured to slit the set of tapes as the set of tapes are laid onto the conveyor bed to form the set of layers of tape, the set of tape lay-down units further configured to slit the set of tapes generally parallel to slit lengths of the unidirectional composite tape.

2. The apparatus of claim 1, wherein the tape source is a set of tape spools connected to the set of tape lay-down units.

3. The apparatus of claim 2, wherein each tape lay-down unit in the set of tape lay-down units comprises:
a tape head configured to lay tape from a tape spool in the set of tape spools onto the conveyor bed;
a cutting unit configured to cut a number of slits in the tape laid onto the conveyor bed; and
a moveable arm configured to position the tape head over the conveyor bed.

4. The apparatus of claim 1 further comprising:
a stitching head configured to connect different layers within the composite fabric formed by the set of tape lay-down units.

5. An apparatus comprising:
a conveyor bed;
a set of tape spools, wherein each tape spool in the set of tape spools has tape comprising a first layer of a composite tape having a layer of fiber spread out to a selected thickness and a layer of porous bonding material melt-bonded onto the layer of fiber to form a unidirectional composite tape;
a set of tape lay-down units configured to lay down a set of tape from a tape source on the conveyor bed at a set of angles to form a set of layers of tape for a composite fabric, wherein each tape lay-down unit in the set of tape lay-down units comprises a tape head configured to lay the tape from a tape spool in the set of tape spools onto the conveyor bed; a moveable arm configured to position the tape head over the conveyor bed while the conveyor bed is moving; and a cutting unit configured to cut slits in the tape as the tape is laid down on the conveyor bed, the set of tape lay-down units further configured to slit the set of tapes generally parallel to slit lengths of the unidirectional composite tape; and a stitching head configured to connect different layers within the composite fabric formed by the set of tape lay-down units.

* * * * *